United States Patent [19]

Makram-Ebeid

[11] Patent Number: 6,134,353
[45] Date of Patent: Oct. 17, 2000

[54] DIGITAL IMAGE PROCESSING METHOD FOR AUTOMATIC EXTRACTION OF STRIP-SHAPED OBJECTS

[75] Inventor: Sherif Makram-Ebeid, Dampierre, France

[73] Assignee: U.S. Philips Corporation, New York, N.Y.

[21] Appl. No.: 08/950,014

[22] Filed: Oct. 14, 1997

[30] Foreign Application Priority Data

Oct. 16, 1996 [FR] France .................................. 96 12631

[51] Int. Cl.[7] .............................. G06K 9/42; G06K 9/44
[52] U.S. Cl. .......................... 382/259; 382/128; 382/132; 382/264
[58] Field of Search ..................... 382/259, 258, 382/254, 128, 132, 173, 264, 256, 257, 195, 199

[56] References Cited

U.S. PATENT DOCUMENTS 5,539,838  7/1996  Shimura .................................. 382/128
5,768,405  6/1998  Makram-Ebeid ....................... 382/128
5,933,518  8/1999  Cohen-Solal ............................ 382/132

OTHER PUBLICATIONS

By R.L. Ogniewicz "Skeleton–Space: A Multiscale Shape Description Combining Region and Boundary Information" Proceedings of the Computer Society Conference on Computer Vision a Pattern Recognition, Seattle, Jun. 21–23, 1994, Institute of Electrical and Electronics Engineers, pp. 746–751.

"Robust Object Representation Through Object–Relevant Use of a Scale" By Bryan Morse, Stephen Pizer Et Al. in "104, SPIE, vol. 2167, Image Processing, 1994, pp. 104–115".

"Computer Vision" By Dana H. Balard and Christopher M. Brown, Published by Prentice Hall, Inc. Englewood Cliffs, New Jersey, US, 07632, p. 77, Lines 6–17.

*Primary Examiner*—Thomas D. Lee
*Attorney, Agent, or Firm*—Dwight H. Renfrew, Jr.

[57] ABSTRACT

A digital image ($J_o$) processing method for automatic extraction of strip-shaped objects, includes a skeletonization operation with steps for forming smoothed images ($J_i$) at several scales ($\sigma_i$), and, in each smoothed image ($J_i$), extracting boundaries of objects, extracting potential median pixels ($\Omega_{iP}$) associated with the center ($\Omega_i$) of a circle of radius ($R_i$) proportional (k) to the scale ($\sigma_i$), tangent to boundaries at a pair of distinct pixels ($E_1, E_2$), and associated with a measure of dependability regarding alignment of the center ($\Omega_i$) and pixels of the pair, extracting median pixels $\Omega_{iM}$, and constructing skeletons of objects by tracking in the digital image ($J_{MED}$) formed by the extracted median pixels. The step of extracting median pixels $\Omega_{im}$ includes a first selection of potential median pixels of the same locations which have the maximum measure of dependability, and a second selection of remaining potential median pixels which locally have a maximum intensity in the direction of alignment.

20 Claims, 7 Drawing Sheets

DIGITAL IMAGE PROCESSING METHOD FOR AUTOMATIC EXTRACTION OF STRIP-SHAPED OBJECTS

FIELD OF THE INVENTION

The invention relates to a digital image processing method for automatic extraction of substantially strip-shaped objects represented on a background.

The invention also relates to a device for carrying out this method in combination with a medical imaging system.

The invention can be used notably in the field of X-ray devices provided with systems for arteriography, including the devices having a fluoroscopy mode.

BACKGROUND OF THE INVENTION

An image processing method for the robust representation of objects is already known from the publication "Robust Object Representation Through Object-Relevant Use of a Scale" by Bryan Morse, Stephen Pizer et al. in "104, SPIE, Vol. 2167, Image Processing, 1994, pp. 104–115".

The cited publication describes an image segmentation method for separating the objects so as to present them in a form appropriate for follow-up (identification, tracking). The method aims to achieve such a representation by elimination of image deterioration due to noise, change in magnification without change of resolution, blurring etc.

The cited publication defines a first concept which is called "CORE" and is the location of points situated at the middle of the object as measured at scales proportional to the width of that object.

A point is said to be situated at the middle, or on a median line of the object, if it satisfies two conditions. The first condition is that there are necessarily at least two boundary points that lie at a distance r (referred to as half-width) or radius from this median point. The second condition is that the direction of said half-width r must be normal to said boundaries.

The cited publication defines a second concept for carrying out the method, being the scale of measurement which is defined by a parameter $\sigma$ which must be proportional to the half-width r.

The "CORE" concept in the cited publication does not represent objects at a single scale from one end of an image to the other, and even does not represent a given object at a single scale within the object itself. The CORE concept represents an object simultaneously in a range of scales forming separate curves within a scale space.

The steps of this segmentation method necessitate first of all the calculation of so-called CORE elements in sub-steps for:

1/smoothing the image at various scales in order to produce a scale space which describes the image over multiple resolutions, 2/evaluating, at each scale, clouds of potential boundary points which form a first fuzzy assembly, called "boundariness", and are calculated by means of appropriate operators, 3/evaluating clouds of median points which form a second fuzzy assembly, called "medialness", are defined by the association of all potential boundary points, and are calculated in the multi-resolution space in conformity with the two conditions described above, 4/finding ridges in the so-called "medialness" fuzzy assembly, said ridges being intensity maxima of this second fuzzy assembly.

The method described in the cited document imposes the localization of the medial line or lines of an object in a digital image while utilizing clouds of boundary points leading to clouds of median points in order to preserve the fuzzy assembly notion as long as possible in a multi-resolution space, implying for each calculation two space variables which are the co-ordinates of the current point in the image, i.e. a variable $\sigma$ which is the core of the multi-resolution smoothing filters and is proportional to a radius r to be found, and an intensity variable which is related to said current point. These calculations must, therefore, be executed on an extremely large number of points, the whole operation having to be performed in a non-Euclidian geometry. This method is not specifically applied to perform the segmentation of an image representing objects of a predetermined specific shape.

SUMMARY OF THE INVENTION

It is an object of the present invention to provide a digital image processing method which resolves the problem of automatically extracting, and not of segmenting, substantially strip-shape objects represented on a background in a digital image by performing simple steps on a small number of pixels, which method is carried out in a Euclidian geometry and does require a substantial amount of calculation time.

This object is achieved by means of a method which includes steps for:

1) forming smoothed images at several scales from the digital image, and for, in each smoothed image:

2) extracting boundary pixels of objects, 3) extracting potential median pixels associated with a location of a center of a circle having a radius which is linked to the scale by a proportionality constant k, tangent to boundaries at a pair of distinct boundary pixels, and associated with a measure of dependability that the center of the circle and the boundary pixels of the pair are substantially aligned, 4) extracting median pixels by way of a first selection of potential median pixels extracted from different smoothed images which have the maximum measure of dependability for the same location, and by way of a second selection of remaining potential median pixels which locally have a maximum intensity substantially in the direction of alignment, and in the digital image formed by extracted median pixels:

5) tracking extracted median pixels in order to construct skeletons of objects.

The method of the invention offers numerous advantages. According to this method, the calculations are performed in flat images which are processed one by one. These calculations are simple and the calculation time is short. This method can be applied for the extraction and the identification of vessels in complex arteriograms, for the characterization of stenoses or aneurysms in arteriograms, for the elimination of objects of known strip-like geometry with a width which deviates from that of the vessels, such as ribs which form a nuisance in the examination of arteriograms of lungs for the detection of emphysema.

BRIEF DESCRIPTION OF THE DRAWINGS

This method and a device for carrying out the method will be described in detail hereinafter with reference to the accompanying diagrammatic drawings; therein:

FIG. 1C shows a digital background estimation image $J_{iBG}$;

FIG. 1D shows a digital image $J_i$ wherefrom the background has been extracted;

FIG. 1E shows a binary map $K_i$ of boundary pixels;

FIG. 1F shows a digital image $J_{imed}$ of median pixels;

FIG. 1G shows a digital image $J_{ISO}$ of median pixels selected by isotropic selection;

FIG. 1H shows a digital image $J_{LAT}$ of median pixels selected by anisotropic or lateral selection;

DESCRIPTION OF PREFERRED EMBODIMENTS

The Figures will be described in detail hereinafter in relation to the various steps of a digital image processing method, including the representation of objects in the form of contrasting strips on a background. These steps perform a skeletonization of the objects of the image in order to furnish automatically the pixels relating to the median lines of the objects and to reconstruct ultimately a digital image in which the objects have an intensity level which contrasts better with the background and is called an enhanced intensity level.

Figure 1A:
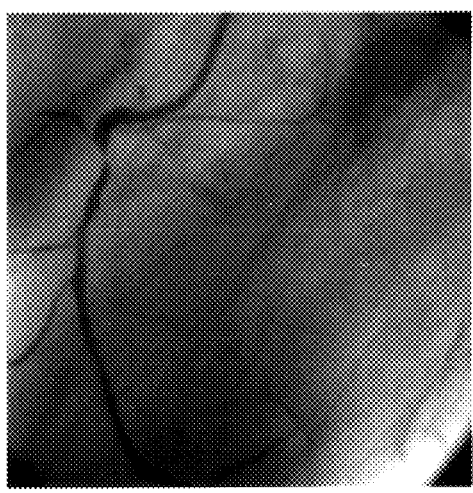
FIG. 1A shows an original digital image $J_{00}$.

As appears from FIG. 1A, the original digital image $J_{00}$ is an arteriogram in the application which is taken by way of example. This arteriogram contains vessels of greatly varying diameter which are represented in this case by dark strips on a non-uniform background. The vessels of very small diameter are particularly difficult to distinguish.

Figure 1B:
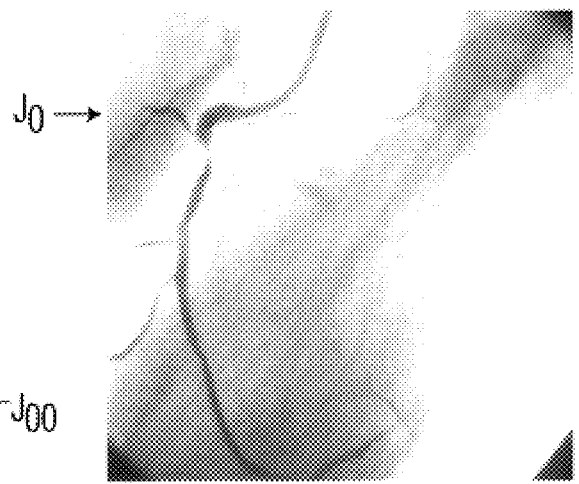
FIG. 1B shows a filtered image $J_0$.
Figure 1C:
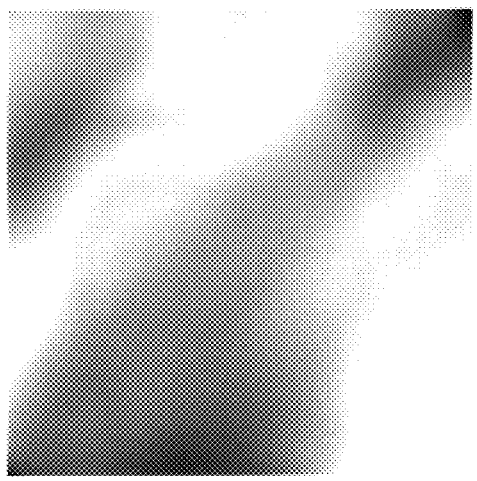
FIGS. 1C to 1H show images $J(\sigma_i)$ smoothed at the same scale $\sigma_i$, and among these Figures.
Figure 1D:
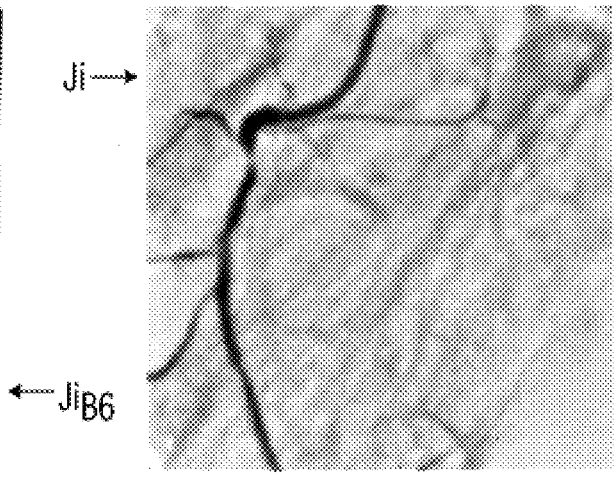
Figure 1E:
Figure 1F:
Figures 1G, 1H:
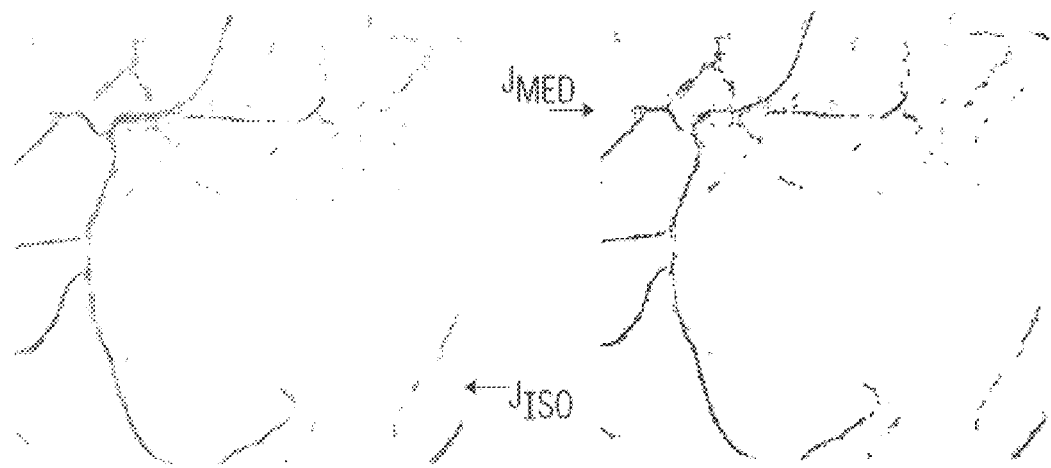
Figures 1I, 1J:
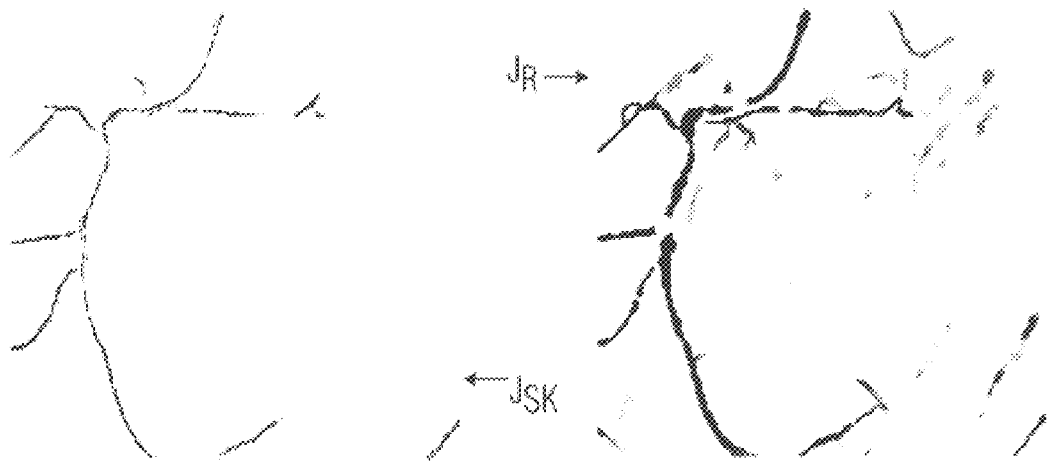
FIG. 1I shows a digital image $J_{SK}$ of median pixels concatenated by tracking in order to form the skeleton of objects.
FIG. 1J shows a digital image JR reconstructed at the scale of the original image by integration of surfaces of circles associated with the median pixels.

As appears from FIG. 1J, after the execution of the segmentation process the image $J_R$ is still digital and contains exclusively the arterial system of the arteriogram of FIG. 1A which is reproduced with a contrasting enhanced intensity level on a uniform background.

Figure 2:
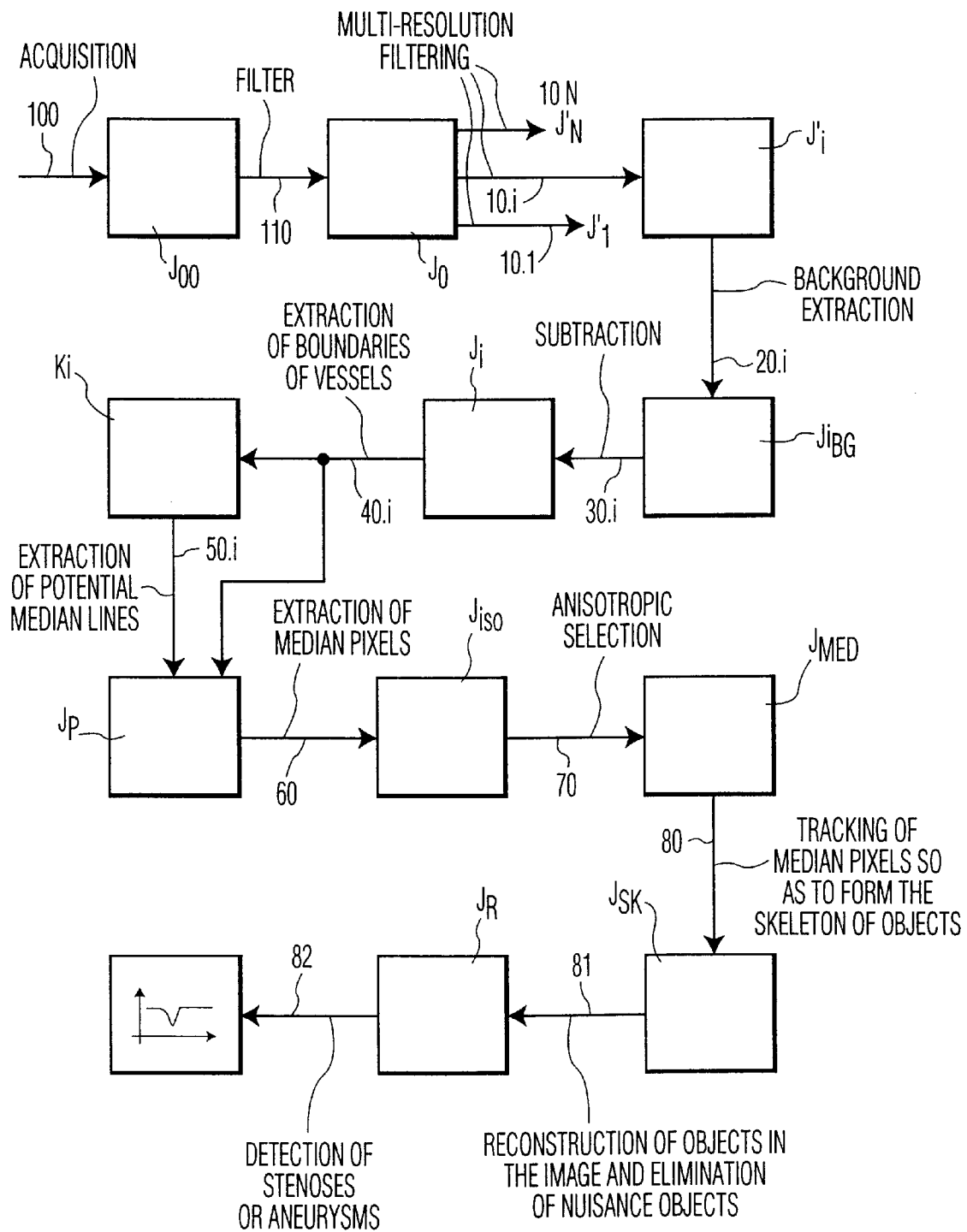
FIG. 2 shows the steps of the method in the form of functional blocks.

Referring to FIG. 2, illustrating the method in the form of functional blocks, the image processing method preferably includes the following succession of steps:

1/Acquisition (100) of a Digital Image $J_{00}$

As is shown in FIG. 1A, digital image forming means 100 acquire the digital image in the form of a two-dimensional matrix $J_{00}$ of pixels having digitized intensity levels. The acquired image $J_{00}$ in this case represents an arteriogram and the vessels form dark strips on a brighter background.

The acquired image is then subjected to a filtering operation 110 which enhances the intensity, for example by means of a conventional look-up table method, in order to supply a digital image $J_0$ as shown by way of example in FIG. 1B.

2/Multi-Resolution Filtering (10.1–10.N)

The filtered image $J_0$ is subjected to a series of N low-pass filters 10.1 to 10.N having cores in the form of isotropic Gaussian functions with different standard deviations $\sigma_1$, to $\sigma_N$ which determine the corresponding resolutions of the N smoothed images $J'_1$ to $J'_N$ obtained by this filtering operation. The number N is, for example such that $2 \leq N \leq 100$, and the index i is such that $1 \leq i \leq N$. Preferably, N=10. In the example where N=10, the multi-resolution filtering is performed by passing ten Gaussian filters 10.1 to 10.10, having respective cores characterized by standard deviations $\sigma_1$, to $\sigma_{10}$, across the image $J_0$, thus producing ten smoothed digital images $J'_1$, to $J'_{10}$, with ten different resolutions. The standard deviations $\sigma_i$ are designated by the term "scale $\sigma_i$" and the corresponding images by $J'_i$.

In each of the images of the series there is studied a single type of vessel which is characterized by its half-width, referred to as $R_i$, so that: $R_i > \sigma_i$. For example, the vessels of half width $R_i = k.\sigma_i$ are studied, where k is a constant. Preferably, k=3, so that $R_i = 3\sigma_i$. The coefficient k and the scale $\sigma_i$ thus define the type of vessel to be detected in each of the images $J'_i$ of the series. The number and the scale value $\sigma_i$ must be carefully chosen so as to enable detection of all vessels, from the very narrow up to the very wide vessels, or other objects in the form of strips.

3/Background Extraction

A background extraction step 20.1 to 20.N is performed on each of the smoothed images $J'_i$ at the scale $\sigma_i$ or in order to eliminate, at every resolution, the elements which do not belong to the arterial system.

Figure 3A:
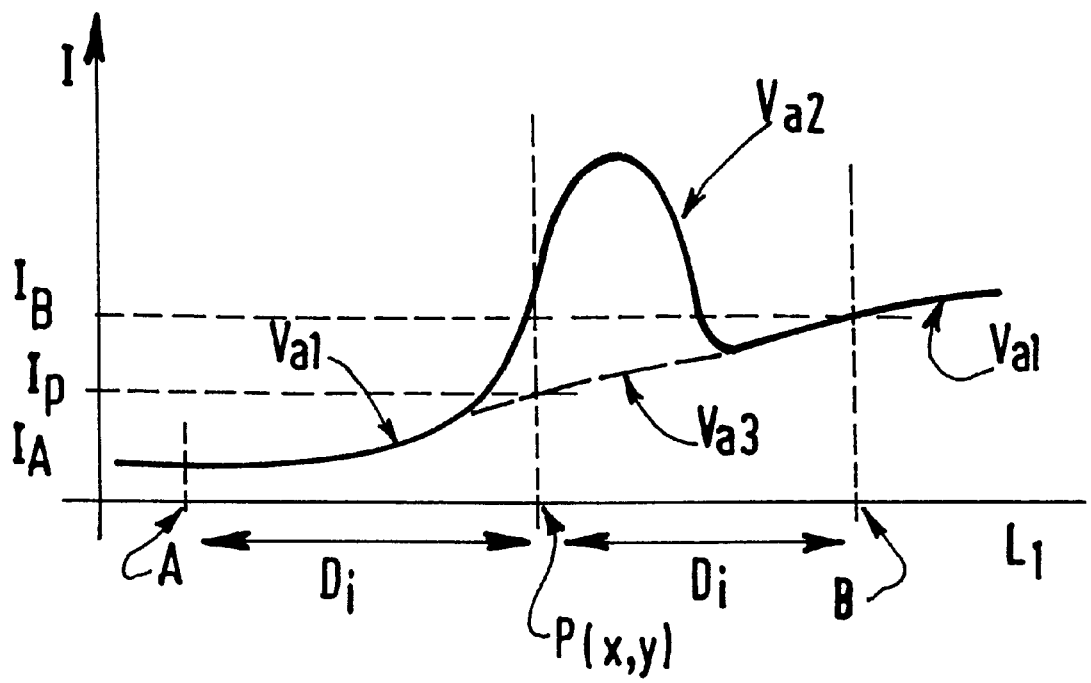
FIGS. 3A and 3B illustrate a step for the extraction of the background at a given scale $\sigma$ and according to different orientations.

FIG. 3A shows a profile of the intensity I along a line L1 of pixels which intersects a vessel Va in the smoothed image $J'_i$. This intensity profile shows a part Va1 with slow intensity variations which corresponds to the background, and a part Va2 which forms an intensity peak corresponding to the vessel. The extraction of the background includes passing a filter 20.i, centered around a current pixel P(x,y) of the line L1, across the smoothed image $J'_i$ and forming a mean value of an intensity $I_A$ of a pixel A situated at a given distance $D_i$ to the left of the current pixel P(x,y) and an intensity $I_B$ of a pixel B situated at the same distance $D_i$ to the right of the current pixel P(x,y) on the line L1. The calculated mean intensity is attributed to the current pixel P(x,y).

The application of the filter 20.i eliminates the intensity peak Va2 due to the vessel, and an intensity level part Va3 is estimated so as to form the background at the location of the vessel.

This filtering step 20.i is performed while adopting, at the scale $\sigma_i$, a distance value $D_i$ such that:

$D_i > R_i = k \sigma_i$; for example, $D_i > 3\sigma_i$.

Figure 3B:
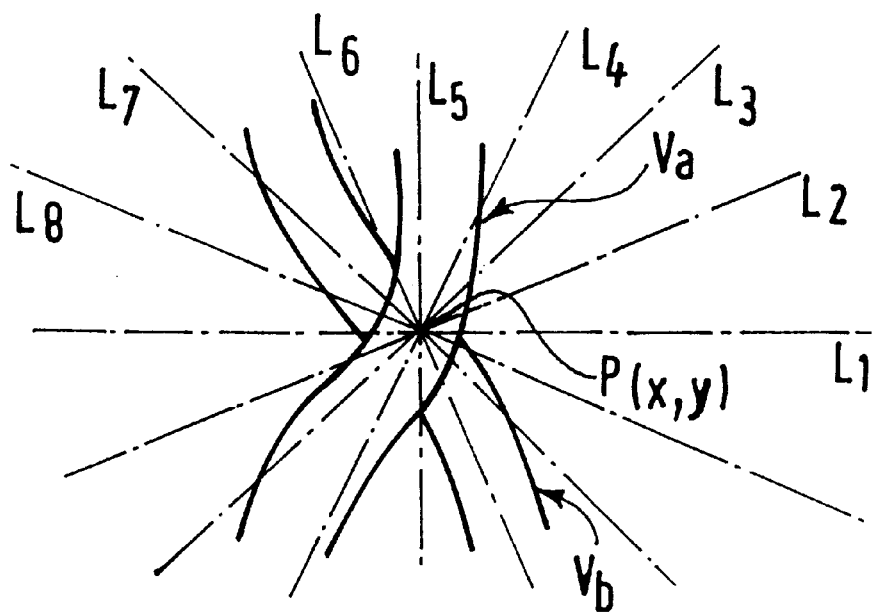

Referring to FIG. 3B, which shows diagrammatically vessels 2Va and 2Vb in the smoothed image $J'_i$, the filtering step 20.i is performed in a plurality P of directions L1 to LP which are regularly distributed from $\pi/P$ to $\pi/P$ in the plane of the image $J'_i$. Preferably, P=8 and the filtering operation 20.i is performed in 8 directions which are spaced apart at regular angles from $\pi/8$ to $\pi/8$.

At each current pixel P(x,y) the intensity value of the background is subsequently estimated as the lowest value of all values estimated while varying the orientation from L1 to LP at the given scale $\sigma_i$. The filtering operation 20.i yields an estimated background image $J_{iBG}$ for each scale $\sigma_i$ as represented, for example in FIG. 1C.

Subsequently, as is shown by way of example in FIG. 1D, an image $J_i$ is formed by attributing calculated intensity data to the pixels while subtracting, by way of a subtraction step 30.i, the intensity values estimated for the background and taken in the image $J_{iBG}$ from the intensity data of the corresponding smoothed image $J'_i$.

Thus, N images are obtained whose background has been extracted, denoted as $J_i$, at the various scales $\sigma_i$.

This background extraction method is particularly advantageous because it does not introduce faults, errors or lack of precision in the regions in which the vessels are superposed, and also because it does not require a large amount of calculation time.

4/Extraction of Boundaries of Objects in the Series of Images $J_i$

A step 40.i is carried out so as to extract the boundaries of vessels having radii $R_i$, studied in each image $J_i$ at a given scale $\sigma_i$, including determination of intensity gradients by calculation of first-order derivatives of the intensity function in the image $J_i$ along perpendicular scanning axes which are denoted as x'x and y'y at each current pixel P(x,y) to be treated.

Preferably, the intensity gradient is obtained by application of oriented filters, known as "Sovel" filters and referred to hereinafter as Sovel$_x$, for the axis x'x and as Sovel$_y$ for the axis y'y, in all directions parallel to the axes x'x and y'y. The use of Sovel filters is described in a general textbook "Computer Vision" by Dana H. Balard and Cristopher M. Brown, published by Prentice Hall, Inc. Englewood Cliffs, N.J., U.S., 07632, p. 77, lines 6–17, in relation with FIG. 3.10C.

Figure 4:
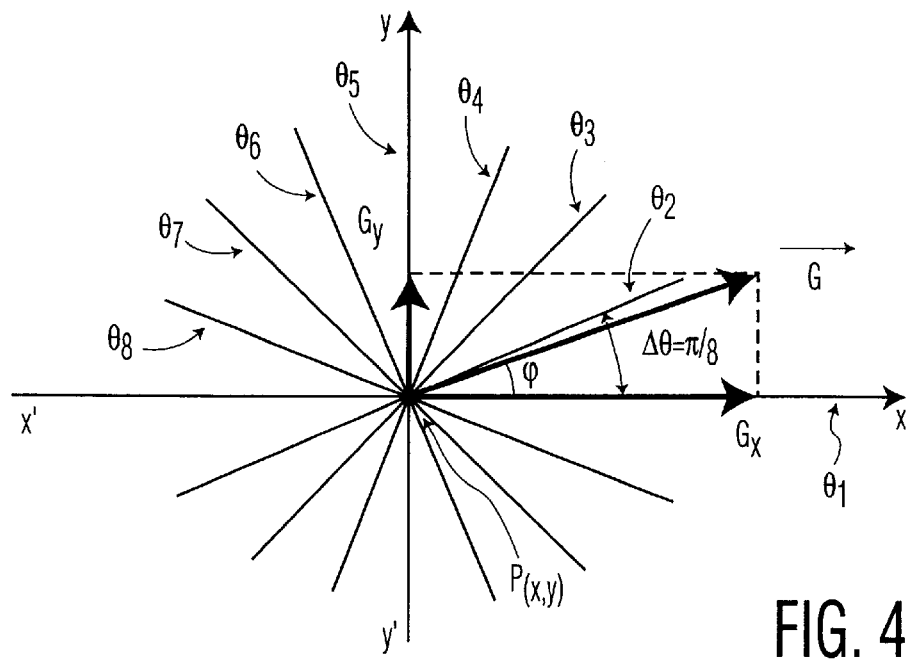
FIG. 4 illustrates the step for extracting boundaries at a given scale $\sigma_i$.

As is shown in FIG. 4, application of the filters Sovel$_x$ and Sovel$_y$ produces components $\vec{G}_x$ and $\vec{G}_y$, along the axes x'x and y'y, of the intensity gradient vector $\vec{G}$ at the current pixel P(x,y). The calculation of the ratio of these components $\vec{G}_x$ and $\vec{G}_y$ furnishes the value of the tangent of an angle $\phi$ enclosed by the vector gradient $\vec{G}$, for example with respect to the axis x'x which is taken as a reference. Calculation of the sum of the projections of the components $\vec{G}_x$ and $\vec{G}_y$ in the direction $\phi$ also produces the modulus $\|\vec{G}\|$ of this gradient vector, except for the sign. Thus, at each current pixel the gradient vector is defined by its orientation angle $\phi$ and its modulus $\|\vec{G}\|$.

The angle $\phi$ is subsequently discretized with a step $\pi/M$, where M is a constant. For example, the constant M is chosen to be equal to 8 and the step of the angle equal to $\pi/8$.

The angle associated with the modulus of the gradient $\|\vec{G}\|$ is then no longer $\phi$, but an angle $\theta_j$ which is the discrete angle chosen nearest to $\phi$. In the case of an angular step $\pi/8$, the angle $\theta_j$ associated with the gradient takes the values:

$\theta_1=0$; $\theta_2=\pi/8$; $\theta_3=\pi/4$; $\theta_4=3\pi/8$; $\theta_5=\pi/2$; $\theta_6=5\pi/8$; $\theta_7=3\pi/4$; $\theta_8=7\pi/8$.

The extraction of boundaries in an image $J_i$ at a given scale $\sigma_i$ subsequently comprises the elimination of non-extreme gradients. This operation is performed by scanning the treated image $J_i$ in a plurality Q of directions which are regularly distributed from $\pi/Q$ to $\pi/Q$ in the plane of the image $J_i$.

In one example, Q=8 is chosen. The scanning directions then correspond to the discrete angles $\theta_1$ to $\theta_8$. The current pixels showing a maximum gradient with respect to their neighbors in each given direction are selected as boundary pixels and their intensity is set to zero, whereas the intensity of pixels showing a non-maximum gradient is set to 1, or vice versa.

In another example, Q=4 is chosen. For example, the scanning directions then correspond to the discrete angles $\theta_1$, $\theta_3$, $\theta_5$, $\theta_7$. The gradients having the angles $\theta_2$ and $\theta_8$ are then projected in the direction $\theta_1$ during scanning, whereas the gradients having the angles $\theta_4$ and $\theta_6$ are projected in the direction $\theta_5$. The current pixels having a maximum gradient are selected and extracted as described above.

Other methods of scanning along a small number of axes which are regularly angularly distributed in the image plane are also possible. During the scanning, the gradients are projected onto that one of these directions which is nearest to its calculated orientation $\theta_1$ to $\theta_M$ and the pixels corresponding to the maximum values of the gradient projections are selected as being boundary pixels.

A binary image $K_i$, referred to as a map of boundary pixels, is formed on the basis of this data, at each scale $\sigma_i$, for example as shown, in FIG. 1E.

5/Extraction of Potential Median Pixels 5.1 Localization of Potential Median Pixels Each boundary pixel has some characteristics, being:

its co-ordinates x,y in the image $K_i$ and a direction $\theta_j$ from among $\theta_1$ to $\theta_M$.

The direction $\theta_j$ is that of the gradient vector with an inaccuracy of less than $\pi/M$. In the described example, the direction $\theta_j$ is that of the gradient vector with an inaccuracy of less than $\pi/8$; the angle $\phi$ of the gradient vector is centered on the discrete direction $\theta_j$ in a range of $\pm\pi/8$.

These characteristics are used for the localization, in each of the digital images $J_i$, of potential median pixels in a step 50.i, that is to say pixels which are situated at substantially the same distance from the boundaries of strip-shaped objects or the vessels.

Figure 5A:
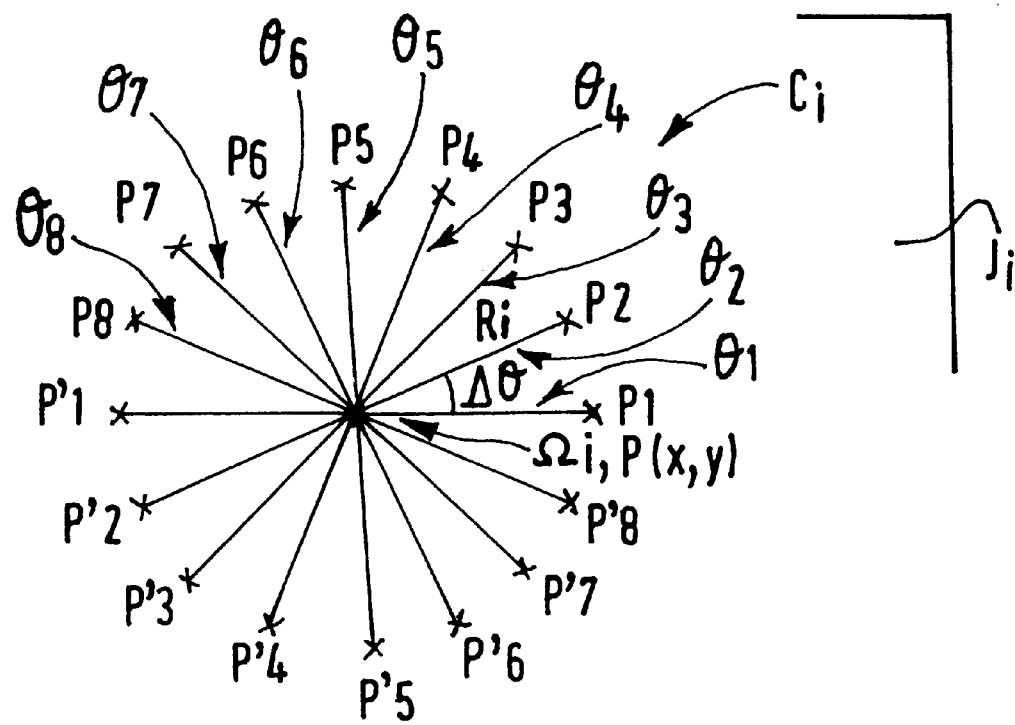
FIG. 5A illustrates the generation of a circle of radii $R_i$ in the step for searching potential median pixels at a given scale $\sigma_i$.

To this end, in the step 50.i first a circle is generated in each image $J_i$ of FIG. 5A, which circle is denoted by the reference $C_i$, has a center $\Omega_i$, a radius of value $R_i$ linked to the scale $\sigma_i$ as described before, and is formed by pixels $P_j$, $P'_j$ arranged at a distance substantially equal to $R_i$ from the center $\Omega_i$ on rays which are oriented in a discrete manner in conformity with the discrete directions $\theta_j$ of the intensity gradients determined above. Subsequently, each image $J_i$ is scanned in a conventional manner, for example along the axis x'x and, referring to FIG. 5B, the center $\Omega_i$ of the circle generated as described above is applied to each current pixel P(x,y) of location x,y. It is searched whether there is at least one boundary pixel $E_1$ which coincides substantially with a pixel $P_j$, $P'_j$ of the circle $C_i$ on a ray in one of the discrete directions $\theta_j$ and whether the discrete orientation direction of the intensity gradient $\vec{G}_{E1}$ associated with this boundary pixel $E_1$ coincides substantially with the direction $\theta_j$ of this ray. Such a boundary pixel $E_1$ is then situated on a first ray tangent to a boundary $B_1$, including the pixel $E_1$, with respect to the circle of centre $\Omega_i$ localized at x,y and having the radius $R_i$. If such a first boundary pixel $E_1$ is found, it is searched, under the same circumstances, whether there is also a second boundary pixel $E_2$ which is distinct from the first boundary pixel and coincides substantially with another pixel of the circle $C_i$ on a ray in another one of the discrete directions $\theta_j$ and whether the discrete orientation direction of the intensity gradient $\vec{G}E_2$ associated with this boundary pixel $E_2$ coincides with the direction of this ray. Such a second boundary pixel $E_2$, is then situated on a second ray tangent to a boundary $B_2$, including the pixel $E_2$, with respect to the circle of center $\Omega_1$ localized at x,y and having the radius $R_i$.

The boundary pixels $E_1$ and $E_2$ are paired if these conditions are satisfied and if, moreover, the gradient vectors both point either towards the center $\Omega_i$ or in the opposite direction, depending on whether the image $J_i$ to be processed is formed by dark objects on a bright background or vice versa. In these circumstances, there is a circle $C_i$ having a radius $R_i$ which is substantially tangent to a first boundary $B_1$ and to a second boundary $B_2$ at $E_1$ and $E_2$, respectively.

Thus, in the same image $J_i$ or in different images $J_i$ at different scales $\theta_i$, there can be defined several pairs of boundary pixels $E_1$, $E_2$ which correspond to a given location x,y. The centers $\Omega_i$ associated with these various pairs are referred to as potential median pixels $\Omega_{iP}$.

5.2 Measure of Dependability

In the step 50.i, moreover, each potential median pixel $\Omega_{iP}$ is assigned a measure of dependability that it is substantially in alignment with the pixels of the pair $E_1$, $E_2$.

Figure 5B:
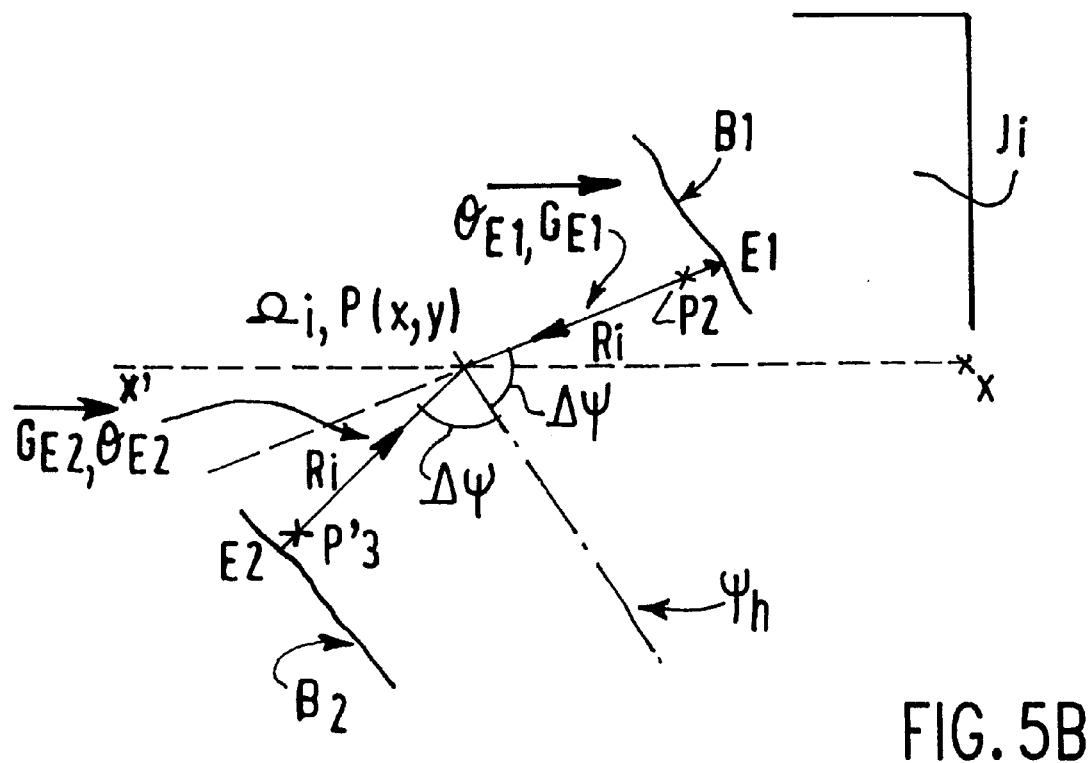
FIG. 5B illustrates the extraction of a first potential median pixel at a given location, associated with a first pair of boundary pixels.
Figure 5C:
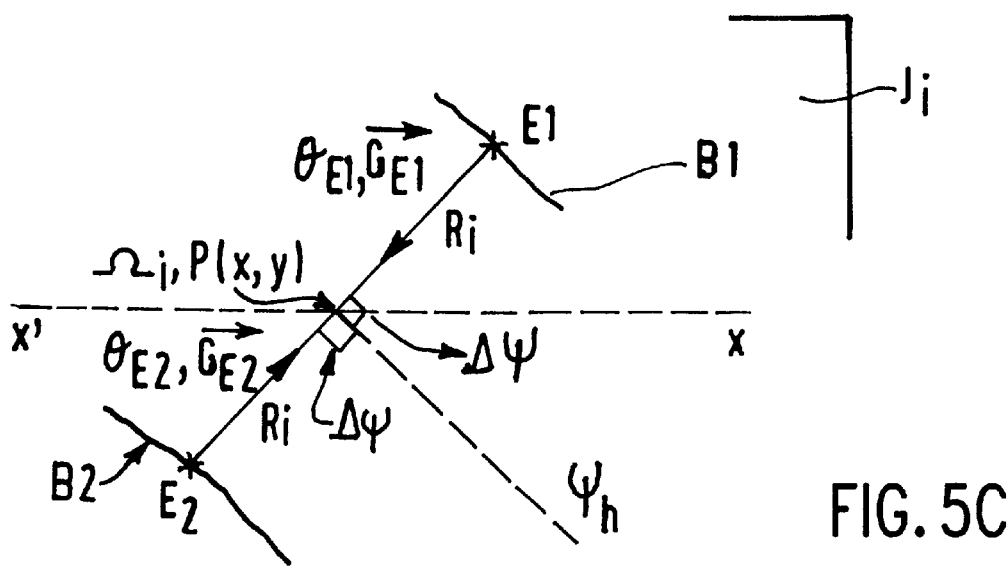
FIG. 5C illustrates the extraction of a second potential median pixel at the same location, associated with a second pair of boundary pixels, in order to perform an isotropic selection sub-step.
Figure 5D:
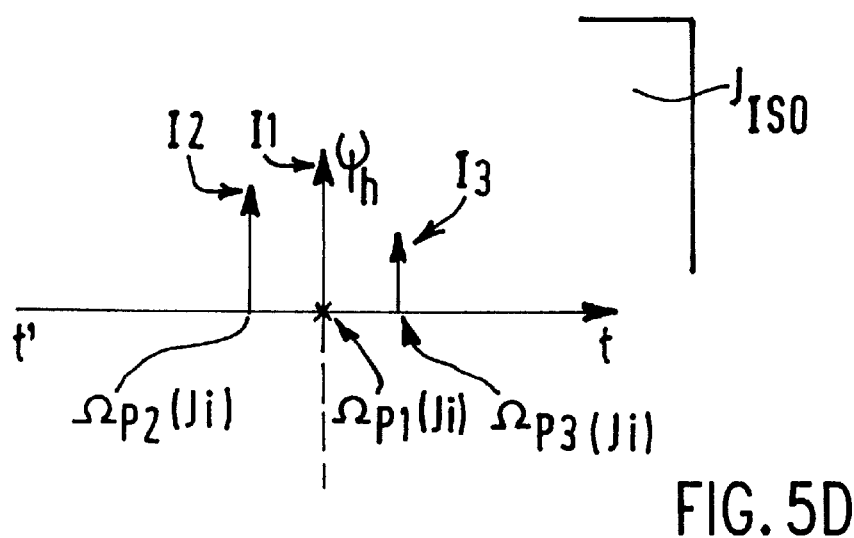
FIG. 5D illustrates the sub-step for lateral selection of potential median pixels in order to supply the median pixels.

Referring to the FIGS. 5B and 5C, to this end there is defined the angle formed between the discretized directions $\theta_{E1}$, $\theta_{E2}$ of intensity gradients associated with the pixels of the pair $E_1$, $E_2$ and also a privileged discrete direction $\psi_h$ which is associated with the potential median pixel $\Omega_{iP}$ which is that of the bisector of this angle and determines a measure of the half-angle $\Delta\psi$ between the discretized directions $\theta_{E1}$, $\theta_{E2}$. The index h is a discretization constant linked to j. The measure of dependability associated with a potential median pixel $\Omega_{iP}$ is given by the product of the smaller one of the two intensity gradient values relating to the pixels of the pair E1, E2 and the value of the sine of the half angle $\Delta\psi$. This measure of dependability is larger as the sine of the half angle $\Delta\psi$ is closer to 1, so as the half angle $\Delta\psi$ is closer to $\pi/2$, corresponding to the case where the potential median pixel is close to being aligned with the pixels of the pair $E_1$, $E_2$ as illustrated in FIG. 5C.

The data relating to the location of the potential median pixels $\Omega_{iP}$ and the associated measures of dependability are then extracted and stored. Each of the corresponding pixels $\Omega_{iP}$ is a candidate for the formation of the median pixels of the objects. The best candidates must be selected. A digital image $J_p$ at the initial scale of the image $J_0$, formed by potential median pixels $\Omega_{iP}$, is illustrated by FIG. 1F.

6/Extraction of Median Pixels 6.1: Isotropic Selection.

In a step 60.i it is examined whether several potential median pixels associated with different pairs of boundary pixels $E_1$, $E_2$ and associated with different measures of dependability exist in the same given location x,y in the same image $J_i$ or in different images $J_i$ at different scales. In that case a first, so-called isotropic selection is performed so as to preserve the best candidate. This selection consists in determining that one of the potential median pixels which occupies this location x,y in an image $J_i$ and also has the maximum measure of dependability, and in eliminating the other potential median pixels of the same location in the same image $J_i$. Moreover, there can also be selected a potential median pixel which has a maximum measure of dependability relative to the potential median pixels of the same location x,y but extracted from different images $J_1$ to $J_M$. In this case the detection of objects having a diameter other than $2R_i$ is favored, i.e. a diameter which is larger or smaller; this is of major importance in the case of overlapping objects. The remaining potential median pixels form a digital image $J_{ISO}$ as shown in FIG. 1G.

6.2: Anisotropic Selection.

The remaining potential median pixels are substantially in alignment with the pixels of the associated pair $E_1$, $E_2$ because of their maximum measure of dependability.

The remaining potential median pixels have different locations. In a step 70 a second, so-called anisotropic selection is then performed. To this end, the image is scanned along a straight line extending perpendicularly to the privileged direction $\psi_h$. A potential median pixel $\Omega_{iP}$ is selected as the median pixel $\Omega_{iM}$ if its intensity is maximum with respect to its neighbors in a window which is smaller than or equal to the radius $R_i$ defined above.

A digital image $J_{MED}$ as illustrated in FIG. 1H is constructed at the scale of the image $J_0$ with all the pixels selected as median pixels $\Omega_{iM}$ of objects in the form of strips or vessels and extracted from all images $J_i$.

7/Tracking of Median Pixels so as to Form the Skeleton of Objects

The pixels extracted as median pixels of the objects during the preceding step are concatenated in the image $J_{MED}$ in a step 80 in order to form the skeleton of objects by determining adjacent pixels while commencing with a starting median pixel.

The extracted median pixels $\Omega_{iM}$ have the characteristics established in the image $J_{MED}$ and in the images $J_i$ wherefrom they have been extracted, being:

their location x,y in the image $J_{MED}$, their initial intensity in the image $J_{MED}$, the privileged direction $\psi_h$ associated therewith and determined in the smoothed image $J_i$, the scale $\sigma_i$ of the smoothed image $J_i$ wherefrom they have been extracted.

Figure 6:
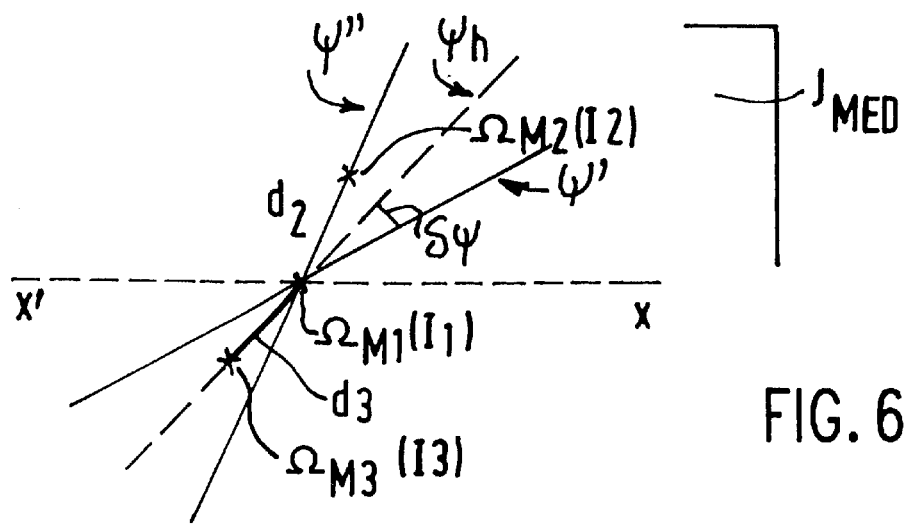
FIG. 6 illustrates the median pixel tracking step for supplying the pixels of the skeleton.

Referring to FIG. 6, the image $J_{MED}$ is scanned in a conventional manner. For a starting median pixel the best neighbors are searched from among the other median pixels so as to form the predecessor pixel and the successor pixel of the skeleton.

To this end, a search angle $\pm\sigma\psi$, for example $\pm\pi/8$, is predetermined around the privileged direction $\psi_h$ and the best neighbors are searched in the sectorial zone thus formed between the straight lines $\psi'$ and $\psi''$ forming angles $\pm\sigma\psi$ around $\psi_h$. In this sectorial zone a maximum search distance d is predetermined, for example d=15 pixels. The predecessor and successor pixels having the intensity nearest to that of the starting pixel are then searched in the sectorial zone and within the distance range. Moreover, not only the median pixels which have been extracted from the same image smoothed at a given scale $\sigma_i$ are admitted to the concatenation, but also the median pixels which have been extracted from other images smoothed at the nearest scales. For example, it is determined in advance that median pixels which have been extracted from the smoothed images at one or two larger and smaller scales will be admitted as best neighbors.

The median pixels $\Omega_{iM}$ found to be the best predecessor and successor, also called adjacent pixels, are attached to the median pixel considered. On the one hand the best predecessors and on the other hand the best successors are thus successively searched, so that on the basis of the digital image $J_{MED}$ there is formed a concatenation of pixels forming the skeleton of objects formed by median pixels, that is to say pixels situated at an equal distance from the boundary of objects. If no further predecessor or successor is found for a given chain, the chain is stopped and another chain is started as from another median pixel serving as the starting pixel. As a result, the skeletons of different objects are extracted independently of one another as illustrated by the image $J_{SK}$ of FIG. 1I.

For example, for later applications numbers q of a continuous series are attributed to each pixel of chains of median pixels.

8/Applications 8.1 Reconstruction of Objects in the Image

In this application a supplementary step 80 is performed for the reconstruction of strip-shaped objects by integration of the surfaces of the different circles of radii $R_i$, relating to the various scales $\sigma_i$ and their centers being formed by the pixels of the skeleton, by attributing the intensities of these centers to these surfaces.

A digital image $J_R$ as shown in FIG. 1J is thus obtained, the objects therein having an intensity which is enhanced because the pixels of extreme intensity have been chosen as the median pixels $\Omega_{iM}$ and ultimately as the skeleton pixels. This image can either be displayed or recorded in appropriate systems. A given number of data concerning each pixel of the skeleton is stored. This data consists of:

its number q, the radius $R_i$ of the circle corresponding to the scale of the image wherefrom the pixel is extracted.

8.2 Elimination of Nuisance Objects From the Image

According to the described method the objects are individually extracted because the pixels of the skeleton are determined by the described tracking method which eliminates, as not forming part of the same object, the predecessor or successor pixels whose privileged direction $\psi_h$ is too remote from that of the tracked pixels. Thus, two objects which overlap cannot be detected as a single object: they are detected as individual objects.

This feature is utilized by an operation 81 for the elimination of nuisance objects from the image. In thorax arteriograms intended for the search for emphysema a problem is encountered in that the ribs are objects in the form of strips which hamper the examination of the vessels which are also shaped as strips, be it of a different diameter. The objects formed by the ribs are eliminated by extraction of the strip-shaped objects having a diameter corresponding to the ribs.

8.3 Detection of Stenoses or Aneurysms

Figure 7:
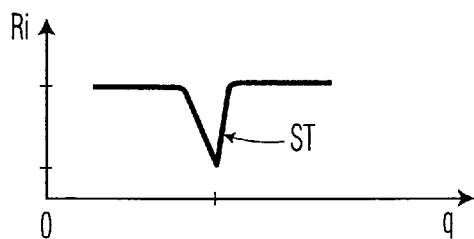
FIG. 7 illustrates the step for studying variations of radii of an object along the skeleton of the object.

In another application, curves of variations of radii $R_i$ as a function of the number "q" of the pixel of the skeleton are generated by an operation 82 which enables easy detection of an abrupt variation of the diameter of the object as shown in FIG. 7.

Abrupt constrictions ST, which may correspond to stenoses, or abrupt increases of the diameter of the object, which may correspond to aneurysms, can thus be detected on such curves. It will be reasonably certain that an increase of the diameter relates to an aneurysm of a given object and is not due to overlapping of objects, because the objects are extracted independently.

This is different from the result of a segmentation method which is not capable of separating two objects which overlap or mask one another.

X-Ray Device

Figure 8:
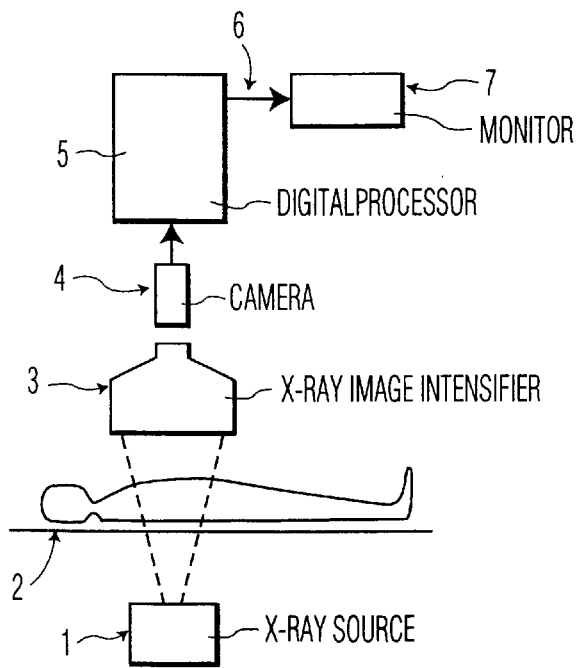
FIG. 8 shows a medical X-ray apparatus for the formation of digital images.

FIG. 8 shows, by way of example, a digital radiography system which includes an X-ray source 1, a mobile table 2 for accommodating a patient, and an image intensifier device 3 which is coupled to a camera tube 4 which applies data to a digital image processing system 5 which includes a microprocessor. The latter has a plurality of outputs, an output 6 of which is coupled to a monitor 7 for the display of the radiographic image or intensity images.

The digitized radiographic image may contain 512×512 or 1024×1024 pixels coded on 8 bits or 10 bits. Each pixel can thus have one of 256 or 1024 intensity levels. For example, the dark regions have a low intensity level and the bright regions of the image have a high intensity level.

The digitized image can be obtained in the fluoroscopy mode. The invention can be used particularly for the processing of arteriographic images.

The various steps and operations of the digital image processing method described above are carried out in the system 5. The data is stored in a memory zone (not shown) and is displayed, if desired, on the monitor 7. Recording means (not shown) may also be used.

What is claimed is:

1. A digital image processing method for automatic extraction from a digital image of substantially strip-shaped objects represented on a background, which method includes an operation for the skeletonizing of objects with steps for:

1) forming, smoothed images at several scales from the digital, image and, in each smoothed image:

2) extracting boundary pixels of objects, 3) extracting potential median pixels associated with a location of a center of a circle having a radius which is linked to the scale by a proportionality constant, tangent to boundaries at a pair of distinct boundary pixels, and associated with a measure of dependability that the center of the circle and the boundary pixels of the pair are substantially aligned, 4) extracting median pixels by way of a first selection of potential median pixels extracted from different smoothed images which have the maximum measure of dependability for the same location, and by way of a second selection of remaining potential median pixels which locally have a maximum intensity substantially in the direction of alignment, and, in a digital image formed by extracted median pixels:

5) tracking extracted median pixels in order to construct skeletons of objects.

2. A method as claimed in claim 1, in which the step of extracting binary pixels of objects includes extraction of a pixel as a boundary pixel of an object when the value of the intensity gradient associated with this pixel is locally maximum in a discretized orientation direction of this gradient, and the step of extracting potential median pixels includes extraction of a potential median pixel associated with a location of the center of the circle if there is a pair of distinct boundary pixels, situated substantially on the circle, on tangent rays coinciding substantially with discretized orientation directions of gradients of the boundary pixels of the pair, and associated with a measure of dependability which is formed by the product of the smallest value of the intensity gradients of the boundary pixels of the couple and the value of the sine of the half-angle between the discretized orientation directions of the corresponding gradients, and also includes the extraction of as many potential median pixels associated with the same location as there are such couples in the different smoothed images.

3. A method as claimed in claim 2, in which the first selection is of a potential median pixel from among several potential median pixels of the same location in the different smoothed images as the pixel for which the product constituting the measure of dependability is maximum, and the second selection is of a median pixel from among remaining potential median pixels as the pixel which presents a maximum intensity considered in an orientation direction perpendicular to the discrete orientation direction of the bisector of the angle between the discretized orientation directions of the gradients of the boundary pixels of the pair associated with this median pixel.

4. A method as claimed in claim 3, in which the step of tracking extracted median pixels includes association of each extracted median pixel with characteristics which include its location in the digital image, its intensity in the digital image the scale of the smoothed image ($J_i$) wherefrom it is extracted, and a privileged direction ($\psi_h$) which is formed by the discrete orientation direction of the bisector of the angle between the discretized orientation directions ($\Theta_{j}$) of the gradients of the two boundary pixels ($E_1$, $E_2$) of the pair which is associated therewith in the smoothed image ($J_i$) wherefrom it is extracted, and determination, on the basis of a location of an extracted median pixel, of an adjacent median pixel which is defined as an extracted median pixel having characteristics in respect of distance, intensity, scale and privileged direction which lie in predetermined ranges, and step by step concatenation of adjacent median pixels.

5. A method as claimed in claim 4, in which the step of extracting potential median pixels includes the generating of a circle which has a center located at the current pixel and is formed by pixels disposed around the center at a distance therefrom which is substantially equal to the value of the radius which is proportional to the scale ($\sigma_i$) of the smoothed image, said pixels of the circle also being disposed on rays in the discretized orientation directions associated with the intensity gradients of the boundary pixels, and includes the application of this circle across the smoothed image, the search for a first boundary pixel which coincides substantially with a pixel of the circle and has a discrete gradient orientation direction coinciding substantially with the corresponding radius of the circle and, if this first boundary pixel is found, the search for a second boundary pixel which coincides substantially with a distinct pixel of the circle which has a discrete gradient orientation direction coinciding substantially with the corresponding radius of the circle, in order to form a pair of boundary pixels associated with the central pixel forming a potential median pixel.

6. A method as claimed in claim 5 which also includes a step for the reconstruction of strip-shaped objects by integration of the surfaces of circles which have a different radius, linked to the scales, and have the pixels of the skeleton as their centers, by attributing the intensities of those centers to those surfaces.

7. A method as claimed in claim 4 which also includes a step for the reconstruction of strip-shaped objects by integration of the surfaces of circles which have a different radius, linked to the scales, and have the pixels of the skeleton as their centers, by attributing the intensities of those centers to those surfaces.

8. A method as claimed in claim 3, in which the step of extracting potential median pixels includes the generating of a circle which has a center located at the current pixel and is formed by pixels disposed around the center at a distance therefrom which is substantially equal to the value of the radius which is proportional to the scale ($\sigma_i$) of the smoothed image, said pixels of the circle also being disposed on rays in the discretized orientation directions associated with the intensity gradients of the boundary pixels, and includes the application of this circle across the smoothed image, the search for a first boundary pixel which coincides substantially with a pixel of the circle and has a discrete gradient orientation direction coinciding substantially with the corresponding radius of the circle and, if this first boundary pixel is found, the search for a second boundary pixel which coincides substantially with a distinct pixel of the circle which has a discrete gradient orientation direction coinciding substantially with the corresponding radius of the circle, in order to form a pair of boundary pixels associated with the central pixel forming a potential median pixel.

9. A method as claimed in claim 8 which also includes a step for the reconstruction of strip-shaped objects by integration of the surfaces of circles which have a different radius, linked to the scales, and have the pixels of the skeleton as their centers, by attributing the intensities of those centers to those surfaces.

10. A method as claimed in claim 3 which also includes a step for the reconstruction of strip-shaped objects by integration of the surfaces of circles which have a different radius, linked to the scales, and have the pixels of the skeleton as their centers, by attributing the intensities of those centers to those surfaces.

11. A method as claimed in claim 2, in which the step of extracting potential pixels includes the generating of a circle which has a center located at the current pixel and is formed by pixels disposed around the center at a distance therefrom which is substantially equal to the value of the radius which is proportional to the scale of the smoothed image, said pixels of the circle also being disposed on rays in the discretized orientation directions associated with the intensity gradients of the boundary pixels, and includes the application of this circle across the smoothed image, the search for a first boundary pixel which coincides substantially with a pixel of the circle and has a discrete gradient orientation direction coinciding substantially with the corresponding radius of the circle and, if this first boundary pixel is found, the search for a second boundary pixel which coincides substantially with a distinct pixel of the circle which has a discrete gradient orientation direction coinciding substantially with the corresponding radius of the circle, in order to form a pair of boundary pixels associated with the central pixel forming a potential median pixel.

12. A method as claimed in claim 11 which also includes a step for the reconstruction of strip-shaped objects by integration of the surfaces of circles which have a different radius, linked to the scales, and have the pixels of the skeleton as their centers, by attributing the intensities of those centers to those surfaces.

13. A method as claimed in claim 2, in which the step of extraction of boundary pixels of objects includes determination of intensity gradient orientations, discretization of these orientations in a plurality of directions which are regularly angularly distributed over $\pi$ radians in the plane of the smoothed image at the scale considered, and application of a criterion for the extraction of boundary pixels which is constituted by the condition that a pixel is detected as a boundary pixel, and is ultimately extracted, if the value of the gradient is maximum, considered locally in that discrete direction determined.

14. A method as claimed in claim 13, in which the for second selection of median pixels includes determination of a discretized orientation direction of the bisector forming a privileged direction associated with the potential median pixel, the scanning of the smoothed image considered perpendicularly to said privileged direction, and the selection of a median pixel of extreme intensity in said direction in a window whose width is smaller than or equal to the radius of the circle.

15. A method as claimed in claim 13 which also includes a step for the reconstruction of strip-shaped objects by integration of the surfaces of circles which have a different radius, linked to the scales, and have the pixels of the skeleton as their centers, by attributing the intensities of those centers to those surfaces.

16. A method as claimed in claim 2 which also includes a step for the reconstruction of strip-shaped objects by integration of the surfaces of circles which have a different radius, linked to the scales, and have the pixels of the skeleton as their centers, by attributing the intensities of those centers to those surfaces.

17. A method as claimed in claim 1 which also includes a step for the reconstruction of strip-shaped objects by integration of the surfaces of circles which have a different radius, linked to the scales, and have the pixels of the skeleton as their centers, by attributing the intensities of those centers to those surfaces.

18. A method as claimed in claim 1, which also includes a step for determining variations of diameters of strip-shaped objects by examining the variations of the radius as a function of a number of a succession attributed to each consecutive pixel of the skeleton.

19. A method as claimed in claim 1, which includes a step of background extraction which is performed on the smoothed images prior to the step of extraction of the boundary pixels, which background extraction step includes:

a sub-step for applying a group of P filters which are regularly angularly oriented over $\pi$ to the pixels of the smoothed image, each filter determining a mean intensity of pixels which are situated to both sides of the current pixel at a distance which is larger than the radius of the vessels in said smoothed image, and attributing this mean value to the current pixel, a sub-step for forming a background image in which each pixel is attributed the lowest intensity value from among the intensities determined by the filters of the group, and a sub-step for the subtraction of the background in the smoothed image.

20. A medical system for the processing of digital medical images representing strip-shaped objects on a background comprising:

a system for the acquisition of a digital image, an image processing system comprising a microprocessor having access to the data of an acquired digital image and for automatically extracting substantially strip-shaped objects from the acquired digital image by skeletonizing objects in the image, and a system for the display of the images acquired by the acquisition system and the images processed by the image processing system, wherein the image processing system is further configured for skeletonizing objects by performing the steps of 1) forming, smoothed images at several scales from the digital image, and, in each smoothed image:
2) extracting boundary pixels of objects,
3) extracting potential median pixels associated with a location of a center of a circle having a radius which is linked to the scale by a proportionality constant, tangent to boundaries at a pair of distinct boundary pixels, and associated with a measure of dependability that the center of the circle and the boundary pixels of the pair are substantially aligned,
4) extracting median pixels by way of a first selection of potential median pixels extracted from different smoothed images which have the maximum measure of dependability for the same location, and by way of a second selection of remaining potential median pixels which locally have a maximum intensity substantially in the direction of alignment, and, in a digital image formed by extracted median pixels:
5) tracking extracted median pixels in order to construct skeletons of objects.

* * * * *